(12) United States Patent
Peng et al.

(10) Patent No.: US 12,406,500 B2
(45) Date of Patent: Sep. 2, 2025

(54) MOMENT LOCALIZATION IN MEDIA STREAM

(71) Applicant: Microsoft Technology Licensing, LLC, Redmond, WA (US)

(72) Inventors: Houwen Peng, Redmond, WA (US); Jianlong Fu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 546 days.

(21) Appl. No.: 17/768,815

(22) PCT Filed: Oct. 19, 2020

(86) PCT No.: PCT/US2020/056390
§ 371 (c)(1),
(2) Date: Apr. 13, 2022

(87) PCT Pub. No.: WO2021/086676
PCT Pub. Date: May 6, 2021

(65) Prior Publication Data
US 2023/0351752 A1    Nov. 2, 2023

(30) Foreign Application Priority Data
Nov. 1, 2019 (CN) .......................... 201911059082.6

(51) Int. Cl.
*G06V 20/40* (2022.01)
*G06F 16/334* (2025.01)
(Continued)

(52) U.S. Cl.
CPC .......... *G06V 20/48* (2022.01); *G06F 16/3344* (2019.01); *G06F 40/10* (2020.01);
(Continued)

(58) Field of Classification Search
CPC .... G06V 20/48; G06V 10/62; G06V 10/7715; G06V 10/82; G06V 20/41; G06V 20/46;
(Continued)

(56) References Cited

U.S. PATENT DOCUMENTS 9,244,924 B2     1/2016  Cheng et al.
2013/0259390 A1  10/2013 Dunlop et al.
(Continued)

FOREIGN PATENT DOCUMENTS

CN    102203761 A    9/2011
CN    102687518 A    9/2012
(Continued)

OTHER PUBLICATIONS

Hendricks et al: Localizing Moments in Video with Natural Language (Year: 2017).*
(Continued)

*Primary Examiner* — Andrew M Moyer
*Assistant Examiner* — Ahmed A Nasher
(74) *Attorney, Agent, or Firm* — Schwegman Lundberg & Woessner, P.A.

(57) ABSTRACT

Various implementations of the subject matter relate to moment localization in media stream. In some implementations, a two-dimensional temporal feature map representing a plurality of moments within a media stream is extracted from the media stream, wherein the two-dimensional temporal feature map comprises a first dimension representing a start of a respective one of the plurality of moments and a second dimension representing an end of a respective one of the plurality of moments. A correlation between the plurality of moments and an action in the media stream is determined based on the two-dimensional temporal feature map.

20 Claims, 9 Drawing Sheets

(51) Int. Cl.
    *G06F 40/10*     (2020.01)
    *G06V 10/62*     (2022.01)
    *G06V 10/77*     (2022.01)
    *G06V 10/82*     (2022.01)

(52) U.S. Cl.
    CPC .......... *G06V 10/62* (2022.01); *G06V 10/7715* (2022.01); *G06V 10/82* (2022.01); *G06V 20/41* (2022.01); *G06V 20/46* (2022.01); *G06V 20/49* (2022.01)

(58) Field of Classification Search
    CPC ..... G06V 20/49; G06F 16/3344; G06F 40/10; G06F 18/253; G06F 16/489; G06F 16/432; G06F 16/43; G06F 40/30; G06N 3/0464; G06N 3/045; G06N 3/08
    See application file for complete search history.

(56) References Cited

U.S. PATENT DOCUMENTS

| | | | |
|---|---|---|---|
| 2017/0270203 A1* | 9/2017 | Liu | G06F 16/73 |
| 2019/0114485 A1* | 4/2019 | Chan | H04N 21/4662 |
| 2020/0193117 A1* | 6/2020 | Raff | G06N 3/048 |
| 2020/0213671 A1* | 7/2020 | Major | H04N 21/234345 |
| 2020/0327160 A1* | 10/2020 | Hsieh | H04N 21/26603 |
| 2021/0109966 A1* | 4/2021 | Ayush | G06N 3/044 |
| 2023/0108883 A1* | 4/2023 | Lovell | G06F 9/5094 706/15 |
| 2024/0412497 A1* | 12/2024 | Athar | G06V 10/26 |

FOREIGN PATENT DOCUMENTS

| | | |
|---|---|---|
| CN | 109564576 A | 4/2019 |
| CN | 110019849 A | 7/2019 |

OTHER PUBLICATIONS

Zhang, et al., "Learning 2D Temporal Adjacent Networks for Moment Localization with Natural Language", In Repository of arXiv: 1912.03590v1, Dec. 8, 2019, 9 Pages. (Year: 2019).*

Chen, et al., "Semantic Proposal for Activity Localization in Videos via Sentence Query", In Proceedings of Thirty-Third AAAI Conference on Artificial Intelligence, vol. 33, Issue 1, Jul. 17, 2019, pp. 8199-8206.

Chen, et al., "Temporally Grounding Natural Sentence in Video", In Proceedings of the Conference on Empirical Methods in Natural Language Processing, Oct. 31, 2018, pp. 162-171.

Chu, et al., "Video Co-Summarization: Video Summarization by Visual Co-Occurrence", In Proceedings of Conference on Computer Vision and Pattern Recognition, Jun. 7, 2015, pp. 3584-3592.

Escorcia, et al., "Temporal Localization of Moments in Video Collections with Natural Language", In Repository of arXiv:1907.12763v1, Jul. 30, 2019, 14 Pages.

Gaidon, et al., "Temporal Localization of Actions with Actoms", In Journal of IEEE Transactions on Pattern Analysis and Machine Intelligence. vol. 35, Issue 11, Nov. 2013, pp. 2782-2795.

Gao, et al., "TALL: Temporal Activity Localization via Language Query", In Proceedings of International Conference on Computer Vision, Oct. 22, 2017, pp. 5277-5285.

Ge, et al., "MAC: Mining Activity Concepts for Language-based Temporal Localization", In Proceedings of Winter Conference on Applications of Computer Vision, Jan. 7, 2019, pp. 245-253.

Gella, et al., "A Dataset for Telling the Stories of Social Media Videos", In Proceedings of the Conference on Empirical Methods in Natural Language Processing, Oct. 31, 2018, pp. 968-974.

Hahn, et al., "Tripping through time: Efficient Localization of Activities in Videos", In Repository of arXiv:1904.09936v1, Apr. 22, 2019, 10 Pages.

Hasan, et al., "Learning Temporal Regularity in Video Sequences", In Proceedings of Conference on Computer Vision and Pattern Recognition, Jun. 27, 2016, pp. 733-742.

Hendricks, et al., "Localizing Moments in Video with Natural Language", In Proceedings of International Conference on Computer Vision, Oct. 22, 2017, pp. 5804-5813.

Hendricks, et al., "Localizing Moments in Video with Temporal Language", In Proceedings of the Conference on Empirical Methods in Natural Language Processing, Oct. 31, 2018, pp. 1380-1390.

Hochreiter, et al., "Long Short-Term Memory", In Journal of Neural Computation vol. 9, Issue 8, Nov. 15, 1997, pp. 1735-1780.

Jiang, et al., "Cross-Modal Video Moment Retrieval with Spatial and Language-Temporal Attention", In Proceedings of International Conference on Multimedia Retrieval, Jun. 10, 2019, pp. 217-225.

Kingma, et al., "Adam: A Method for Stochastic Optimization", In Repository of arXiv:1412.6980v1, Dec. 22, 2014, 9 Pages.

Krishna, et al., "Dense-Captioning Events in Videos", In Proceedings of International Conference on Computer Vision, Oct. 22, 2017, pp. 706-715.

Lei, et al., "TVQA: Localized, Compositional Video Question Answering", In Proceedings of Conference on Empirical Methods in Natural Language Processing, Oct. 31, 2018, pp. 1369-1379.

Li, et al., "Global-Local Temporal Representations For Video Person Re-Identification", In Repository of arXiv:1908.10049v1, Aug. 27, 2019, 10 Pages.

Lin, et al., "BMN: Boundary-Matching Network for Temporal Action Proposal Generation", In Repository of arXiv:1907.09702v1, Jul. 23, 2019, 10 Pages.

Lin, et al., "Single Shot Temporal Action Detection", In Proceedings of 25th ACM International Conference on Multimedia, Oct. 23, 2017, pp. 988-996.

Liu, et al., "Attentive Moment Retrieval in Videos", In Proceedings of 41st International ACM SIGIR Conference on Research & Development in Information Retrieval, Jul. 8, 2018, pp. 15-24.

Liu, et al., "Cross-modal Moment Localization in Videos", In Proceedings of the 26th ACM International Conference on Multimedia, Oct. 22, 2018, pp. 843-851.

Liu, et al., "Temporal Modular Networks for Retrieving Complex Compositional Activities in Videos", In Proceedings of 15th European Conference on Computer Vision, Sep. 8, 2018, pp. 569-586.

"International Search Report and the Written Opinion Issued in PCT Application No. PCT/US20/056390", Mailed Date: Feb. 9, 2021, 12 Pages.

Pennington, et al., "GloVe: Global Vectors for Word Representation", In Proceedings of Conference on Empirical Methods in Natural Language Processing, Oct. 25, 2014, pp. 1532-1543.

Regneri, et al., "Grounding Action Descriptions in Videos", In Journal of Transactions of the Association for Computational Linguistics, vol. 1, Mar. 1, 2013, pp. 25-36.

Rohrbach, et al., "Script Data for Attribute-Based Recognition of Composite Activities", In Proceedings of 12th European Conference on Computer Vision, Oct. 7, 2012, pp. 144-157.

Shao, et al., "Find and Focus: Retrieve and Localize Video Events with Natural Language Queries", In Proceedings of 15th European Conference on Computer Vision, Sep. 8, 2018, pp. 202-218.

Sigurdsson, et al., "Hollywood in Homes: Crowdsourcing Data Collection for Activity Understanding", In Proceedings of 14th European Conference on Computer Vision, Oct. 11, 2016, pp. 510-526.

Simonyan, et al., "Very Deep Convolutional Networks for Large-Scale Image Recognition", In Repository of arXiv:1409.1556v6, Apr. 10, 2015, 14 Pages.

Song, et al., "TVSum: Summarizing Web Videos using Titles", In Proceedings of Conference on Computer Vision and Pattern Recognition, Jun. 7, 2015, pp. 5179-5187.

Song, et al., "VAL: Visual-Attention Action Localizer", In Proceedings of 19th Pacific-Rim Conference on Multimedia, Sep. 21, 2018, pp. 340-350.

Tran, et al., "Learning Spatiotemporal Features with 3D Convolutional Networks", In Proceedings of International Conference on Computer Vision, Dec. 7, 2015, pp. 4489-4497.

(56) References Cited

OTHER PUBLICATIONS

Vaswani, et al., "Attention Is All You Need", In Proceedings of 31st Conference on Neural Information Processing Systems, Dec. 4, 2017, 11 Pages.

Vijayanarasimhan, et al., "Capturing Special Video Moments with Google Photos", Retrieved from: https://ai.googleblog.com/2019/04/capturing-special-video-moments-with.html, Apr. 3, 2019, 5 Pages.

Wang, et al., "Language-Driven Temporal Activity Localization: A Semantic Matching Reinforcement Learning Model", In Proceedings of Conference on Computer Vision and Pattern Recognition, Jun. 15, 2019, pp. 334-343.

Wu, et al., "Adaptive Graph Representation Learning for Video Person Re-identification", In Repository of arXiv:1909.02240v1, Sep. 5, 2019, 10 Pages.

Wu, et al., "Multi-modal Circulant Fusion for Video-to-Language and Backward", In Proceedings of the Twenty-Seventh International Joint Conference on Artificial Intelligence, Jul. 13, 2018, pp. 1029-1035.

Xu, et al., "Multilevel Language and Vision Integration for Text-to-Clip Retrieval", In Proceedings of Thirty-Third AAAI Conference on Artificial Intelligence, vol. 33, Issue 1, Jul. 17, 2019, pp. 9062-9069.

Yuan, et al., "To Find Where You Talk: Temporal Sentence Localization in Video with Attention Based Location Regression", In Proceedings of Thirty-Third AAAI Conference on Artificial Intelligence, vol. 33, Issue 1, Jul. 17, 2019, pp. 9159-9166.

Zhang, et al., "Cross-Modal Interaction Networks for Query-Based Moment Retrieval in Videos", In Proceedings of the 42nd International ACM SIGIR Conference on Research and Development in Information Retrieval, Jul. 21, 2019, pp. 655-664.

Zhang, et al., "Exploiting Temporal Relationships in Video Moment Localization with Natural Language", In Proceedings of 27th ACM International Conference on Multimedia, Oct. 21, 2019, pp. 1230-1238.

Zhang, et al., "Learning 2D Temporal Adjacent Networks for Moment Localization with Natural Language", In Repository of arXiv:1912.03590v1, Dec. 8, 2019, 9 Pages.

Zhang, et al., "MAN: Moment Alignment Network for Natural Language Moment Retrieval via Iterative Graph Adjustment", In Proceedings of Conference on Computer Vision and Pattern Recognition, Jun. 15, 2019, pp. 1247-1257.

Zhang, et al., "Temporal Reasoning Graph for Activity Recognition", In Repository of arXiv:1908.09995v1, Aug. 27, 2019, 14 Pages.

Zhao, et al., "Temporal Action Detection with Structured Segment Networks", In Proceedings of International Conference on Computer Vision, Oct. 22, 2017, pp. 2933-2942.

First Office Action Received for Chinese Application No. 201911059082.6, mailed on Jan. 5, 2024, 12 pages. (English Translation Provided).

Communication pursuant to article 94(3) received for European Application No. 20804727.4, mailed on Jul. 12, 2024, 06 pages.

Third Office Action Received for Chinese Application No. 201911059082.6, mailed on Nov. 6, 2024, 20 pages. (English Translation Provided).

Second Office Action Received for Chinese Application No. 201911059082.6, mailed on Aug. 17, 2024, 15 pages. (English Translation Provided).

Notice of Allowance Received for Chinese Application No. 201911059082.6, mailed on Mar. 3, 2025, 06 pages. (English Translation Provided).

\* cited by examiner

MOMENT LOCALIZATION IN MEDIA STREAM

CROSS-REFERENCE TO RELATED APPLICATION

This application is a U.S. National Stage Filing under 35 U.S.C. 371 of International Patent Application Serial No. PCT/US2020/056390, filed Oct. 19, 2020, and published as WO 2021/086676 A1 on May 6, 2021, which claims priority to Chinese Application No. 201911059082.6, filed Nov. 1, 2019, which applications and publication are incorporated herein by reference in their entirety.

BACKGROUND

Currently, video understanding is an important research area in the field of computer vision. For example, moment localization with natural language is a research topic of interest in video understanding. For example, a location of a moment in a video matching an action can be determined by specified a natural language query of the action.

SUMMARY

In accordance with some implementations, there is provided a solution for processing a media stream based on a neural network. A two-dimensional temporal feature map representing a plurality of moments within a media stream is extracted from the media stream. The two-dimensional temporal feature map comprises a first dimension representing a start of a respective one of the plurality of moments and a second dimension representing an end of a respective one of the plurality of moments. Subsequently, a correlation between the plurality of moments and an action in the media stream is determined based on the two-dimensional temporal feature map.

This Summary is provided to introduce selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF THE DRAWINGS

Throughout the drawings, the same or similar reference signs refer to the same or similar elements

DETAILED DESCRIPTION

The subject matter is now discussed with reference to several example implementations. It is to be understood these implementations are discussed only for the purpose of enabling those skilled persons in the art to better understand and thus implement the subject matter, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Figure 1:
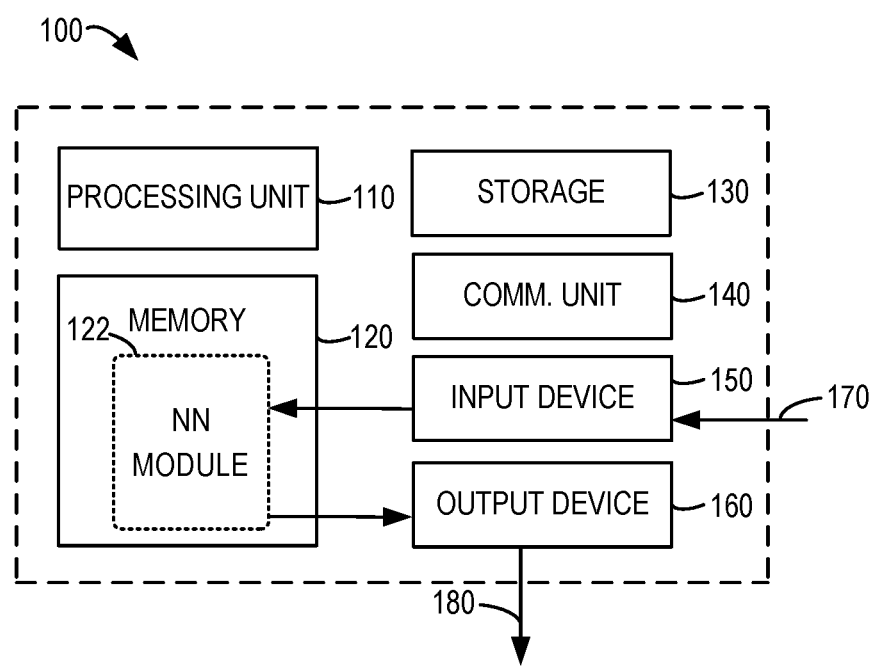
FIG. 1 illustrates a block diagram of a computing device where implementations of the subject matter can be implemented.

Basic principles and several examples of the subject matter are explained below with reference to the drawings. FIG. 1 illustrates a block diagram of a computing device 100 that can carry out implementations of the subject matter. It should be understood that the computing device 100 shown in FIG. 1 is only exemplary and shall not constitute any restrictions over functions and scopes of the implementations described by the subject matter. According to FIG. 1, the computing device 100 may be in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller. In addition, the processing unit 110 may also be implemented as Graphical Processing Unit (GPU) for executing parallel computation like compute-intensive processing and the like.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a neural network (NN) module 122 configured to execute functions of various implementations described herein. The neural network module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the subject matter. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 may be used for implementing a solution of an artificial neural network in accordance with implementations of the subject matter. The computing device 100 may receive via the input device 150 input data, for example media streams like video and audio. Besides, the computing device 100 may also receive via the input device 150 a query for a specific action in the video, wherein the query may be in the form of text or audio. The Neural Network (NN) module 122 may process the input data to determine corresponding output data, such as a location of an action specified by the query in the video. The output data may be provided to the output device 160 as output 180 for users.

As described above, moment localization is an important branch application of video understanding with the purpose of determining a moment of an action matching the query in the video, for example, starting time and end time. The term "action" does not necessarily indicate a strong body movement and may also represent a continuous state, for example, a stationary state. For example, in a video of teaching saxophone, the teacher may play the saxophone over a certain time period, talk about playing the saxophone over another time period and play the saxophone again later. If users intend to query when the teacher is playing the saxophone, they may provide a corresponding natural language query, for example "someone is playing the saxophone." If users want to query when the teacher is talking about playing the saxophone, they may provide a corresponding natural language query like "someone is talking about playing the saxophone." If users want to query when the teacher is playing the saxophone again, they may provide a corresponding natural language query like "someone is playing the saxophone again."

Although application scenarios in accordance with implementations of the subject matter are introduced above with reference to moment localization of the video, it should be understood that implementations of the subject matter may be applied into any other suitable scenarios. For example, in addition to video understanding, implementations of the subject matter may also be applied into other media streams like audio or video. As another example, implementations of the subject matter may further be applied into other areas of the video understanding, e.g., temporal action proposal or temporal action detection etc. For example, the temporal action proposal refers to determining from the video the moments that possibly contain the action. Therefore, in such application, it is unnecessary to use query as input. The temporal action detection may classify the proposals based on the temporal action proposal without using the query as input.

Figure 2:
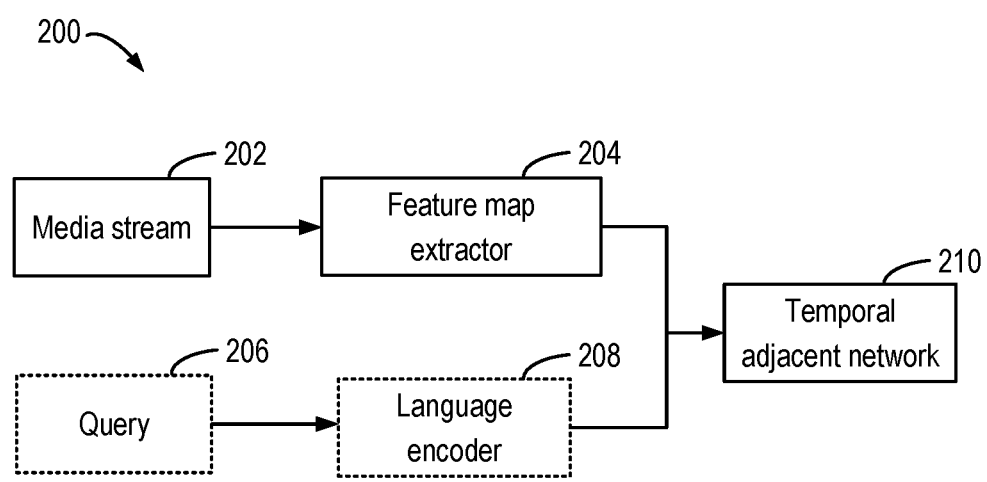
FIG. 2 illustrates a schematic diagram of architecture of a two-dimensional temporal adjacent network in accordance with some implementations of the subject matter.

FIG. 2 illustrates a schematic diagram of a neural network 200 carrying out moment localization with natural language in accordance with some implementations of the subject matter. The moment, also known as a period, represents a segment of the media stream, for example a segment of a video.

As shown in FIG. 2, the neural network 200 receives the media stream 202 as input, where the media stream 202 may be an untrimmed media stream like video and/or audio. The media stream 202 usually refers to a segment of media with a certain length, the length being defined by the starting time and end time. The media stream may be divided into frames as basic unit in time dimension and the media stream therefore may also be known as a frame sequence. To facilitate the description, video V serves as an example below to describe the neural network 200. For example, the video V may be untrimmed and include more than one action.

In moment localization with natural language, the neural network 200 is configured to extract video clips matching the query 206, i.e., a moment M. In particular, the query sentence may be denoted as $S=\{s_i\}_{i=0}^{l^S-1}$, where $S_i$ denotes a word or character in a sentence and $l^S$ denotes the total word count. The video V may be represented as a frame sequence, i.e., $V=\{x_i\}_{i=0}^{l^V-1}$, where $x_i$ denotes one frame in the video V and $l^V$ denotes the total number of frames. The neural network 200 is configured to enable the extracted moment starting from the frame $x_i$ to the frame $x_j$ to have the same meaning as the input sentence S.

Figure 3A:
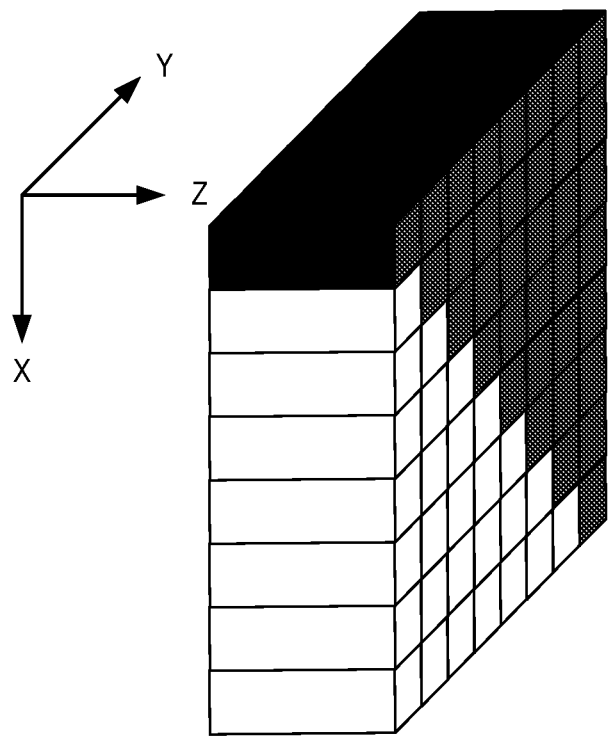
FIGS. 3A and 3B illustrate a schematic diagram of two-dimensional temporal feature map in accordance with some implementations of the subject matter.
Figure 3B:
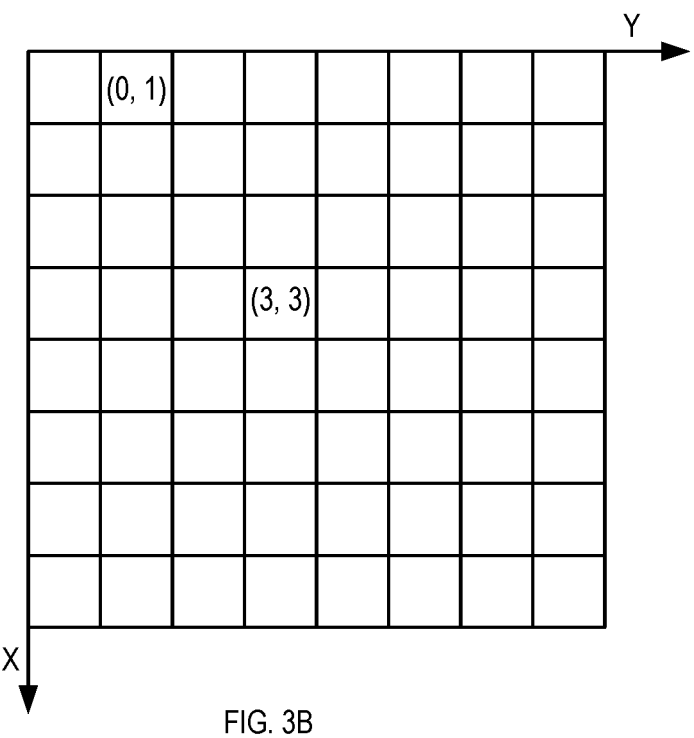

As shown in FIG. 2, the feature map extractor 204 extracts a 2D temporal feature map from the media stream 202. FIGS. 3A and 3B illustrate examples of the 2D temporal feature map in accordance with some implementations of the subject matter. The 2D temporal feature map includes three dimensions, including two time dimensions X, Y, and a feature dimension Z. For example, X dimension represents starting time of moments and Y dimension represents end time of moments. FIG. 3B illustrates two time dimensions of the 2D temporal feature map of FIG. 3A.

For example, the video V may be segmented into N video clips of the same length, where the length of each video clip is □. For example, coordinates (0, 1) represent a moment starting from 0 and ending at 2□□ and including the first and second clips; coordinates (3, 3) indicate a moment starting from 3□ and ending at 4□, i.e., the fourth clip. A portion of FIG. 3B where X coordinate value is greater than Y coordinate value is invalid and a portion of FIG. 3B where X coordinate value equals to Y coordinate value indicates a moment of one video clip length. A portion of FIG. 3B where X coordinate value is smaller than Y coordinate value represents the moments each having a length greater than one video clip length.

Alternatively, the length of the moment may be used as the Y dimension. In this case, the coordinates in FIGS. 3A and 3B can be easily converted to the alternative embodiment, which will not be elaborated here.

In addition, the neural network 200 may also receive the query 206 for the media stream 202. For example, the query 206 may be a sentence or a voice speech. For the sake of convenience, the sentence S serves as an example of the query 206 below for description.

As shown in FIG. 2, the language encoder 208 may encode the query 206 to generate a vector representation of the query 206. The query 206 may be encoded using any suitable method currently known or to be developed in the future. The vector representation of the query 206 is provided to a temporal adjacent network 210 together with the 2D temporal feature map. The temporal adjacent network 210 may fuse the vector representation of the query 206 with the 2D temporal feature map to determine scores of correlation between the respective moments and the action specified by the query 206. For example, when determining the scores of respective moments, the temporal adjacent network 210 may perceive the context to more conveniently extract the discriminative features of the moments.

As described above, implementations of the subject matter may also be applied into any other suitable scenarios like temporal action proposal or temporal action detection etc. In these scenarios, it is only required to provide the 2D temporal feature map to the temporal adjacent network for the discriminative purpose without the query 206 and the language encoder 208.

With the 2D temporal feature map, more than one moment can be evaluated simultaneously, which allows the video context information between different moments to be considered. Compared with evaluating the moments one by one, implementations of the subject matter can extract discriminative features to distinguish different moments. In this way, it is more convenient to extract the moment that best matches the query.

Figure 4:
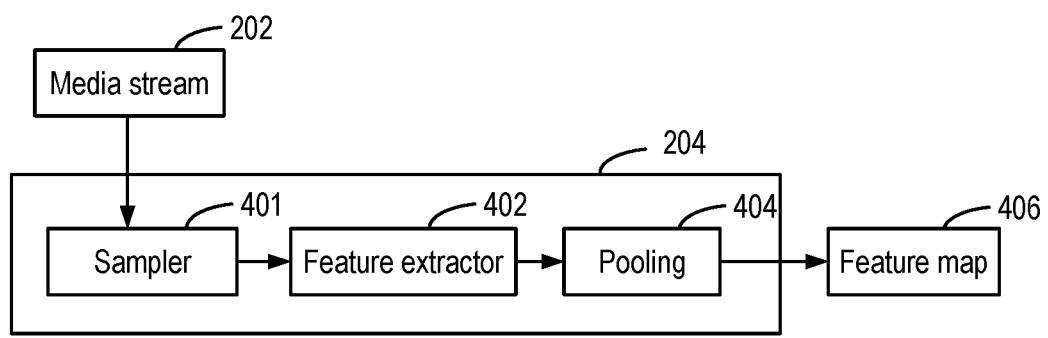
FIG. 4 illustrates a schematic diagram of a feature map extractor in accordance with some implementations of the subject matter.

FIG. 4 illustrates a schematic diagram of the feature map extractor 204 in accordance with some implementations of the subject matter. The feature map extractor 204 includes a sampler 401 segmenting the video V into small video clips, where each video clip $v_i$ may include K frames. Then, a fixed-interval sampling may be performed on the video clips, for example, to selection at least a part of the K frames for sampling. In this way, the sampler 401 may obtain N video clips denoted as $V=\{v_i\}_{i=0}^{N-1}$.

The feature extractor 402 may extract features of each video clip and output a representation of the video clip $f^V \in \mathbb{R}^{d^V}$, where $d^V$ denotes a feature dimension. For example, the feature extractor 404 may be implemented via a Convolutional Neural Network (CNN). In some implementations, a fully-connected layer having $d^V$ output channels may be disposed after the convolutional neural network to output a feature vector of the feature dimension $d^V$.

N video clips may serve as the basic elements for constructing candidate moments. For example, a feature map of the candidate moments may be constructed based on the features of the video clips obtained via the feature extractor 402. For example, a pooling layer 404 may extract features of respective moments from the features of the N video clips, to obtain the 2D temporal feature map 406 as shown in FIGS. 3A and 3B. For example, the pooling layer 404 may be a max pooling layer. As a parameter-free approach, the max pooling can lower the computation amount of the system. For example, max pooling may be performed on the features of all clips corresponding to each moment to calculate its feature $f_{a,b}^M = \mathrm{maxpool}(f_a^V, f_{a+1}^V, \ldots, f_b^V)$, where a and b represent indices of starting clip and end clip while satisfying $0 \leq a \leq b \leq N-1$. Taking the moment denoted by the coordinates (0, 1) in FIG. 3B as an example, the max pooling is performed on the first and second clips. In this way, more adjacent clips are pooled for a longer moment while fewer clips are pooled for a shorter moment.

It should be appreciated that the pooling layer 404 may be replaced by any other suitable way. For example, a convolutional neural network may replace the pooling layer 404. As an example, a stacked multi-layer convolution neural network may replace the pooling layer 404.

The feature map extractor 204 may construct all moments into 2D temporal feature map 206, denoted as $F^M \in \mathbb{R}^{N \times N \times d^V}$. As described above, the 2D temporal feature map $F^M$ is composed of three dimensions, where two dimensions N represent indices of starting and end clips respectively while a third dimension $d^V$ indicates the feature dimension. The feature of the moment starting from clips $v_a$ to $v_b$ is $F^M[a, b, :]$, where $F^M[a,b,:]=f_{a,b}^M$.

Indices of starting clip and end clip of the moment a and b should satisfy a≤b. Therefore, in the 2D temporal feature map, all moments within an area where a>b (i.e., lower triangular part of the feature map) are invalid. For example, the features in this area may be padded with zero.

In some implementations, all possible adjacent video clips may act as candidate clips. However, this processing mechanism may result in a great computation overhead for subsequent processing. In some implementations, the computation overhead may be decreased by a sparse sampling solution, in which redundant moments with large overlaps may be deleted from the candidate moments. Specifically, short moments may be sampled densely and the sample interval increases as the moment length increases.

Figure 5:
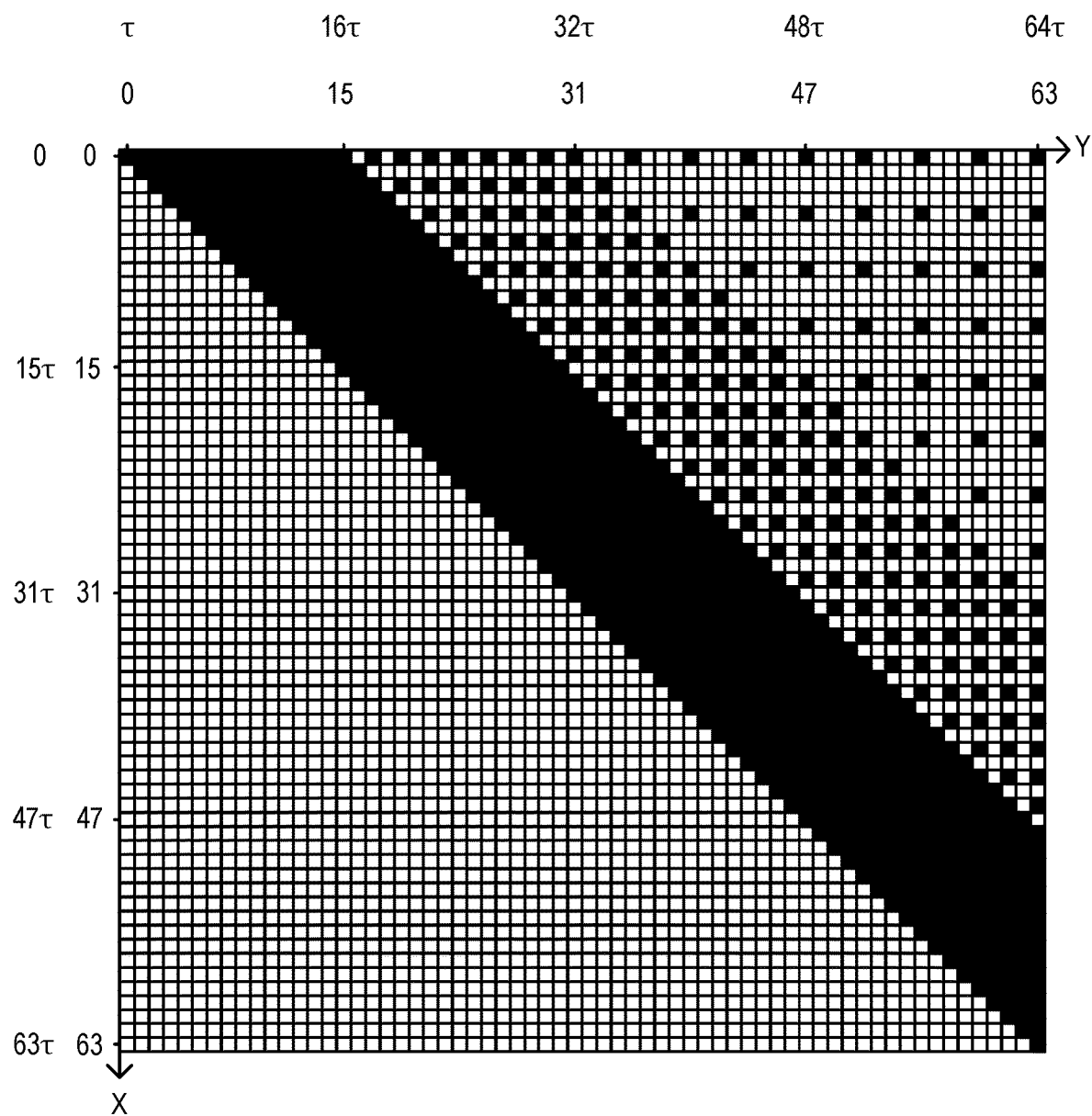
FIG. 5 illustrates a schematic diagram of a sparse sampling method in accordance with some implementations of the subject matter.

FIG. 5 illustrates an example of such a sparse sampling solution. FIG. 5 shows a 2D temporal feature map similar to FIG. 3B, where each small square indicates a moment. Starting time and its index are illustrated on X-axis while end time and its index are illustrated on Y-axis. In FIG. 5, the lower triangular part is an invalid portion and the upper triangular part is a valid portion. The upper triangular part of FIG. 5 includes two patterns, i.e., black-padded square and white-padded square, the black-padded square being sampled as candidate moments. It can be seen from FIG. 5 that moments with a small difference between X and Y indices have a low overlapping rate and thus can all act as the candidate moments. As the difference between X and Y indices increases, the overlapping rate between the moments increases and the candidate moments can be selected to be more sparse accordingly.

This coefficient sampling solution may be represented in mathematical language. For example, when the number of sampled clips is small (such as N≤16), all possible moments may be listed as candidate moments as shown in FIG. 3B. When N becomes large (such as N>16), moments starting from clips $v_a$ to $v_b$ may be selected as candidate moments when satisfying the following condition:

$$G(a,b)) \Leftarrow (a \bmod s=0) \& ((b-s') \bmod s=0), \quad (1)$$

where a and b denote clip index, mod denotes modulus, & denote AND and s and s' are defined as follows:

$$s = 2^{k-1}, \quad (2)$$

$$s' = \begin{cases} 0 & k=1 \\ 2^{k+2}-1 & k \mathrel{!}= 1 \end{cases}$$

where $$k = \left\lceil \log_2\left(\frac{b-a+1}{8}\right) \right\rceil$$

and $\lceil \cdot \rceil$ denotes rounding up. If G(a,b)=1, this moment is selected as the candidate moment; otherwise, it will not be selected. Such sampling strategy can largely reduce the number of candidate moments and further lower the computation overheads.

Figure 6:
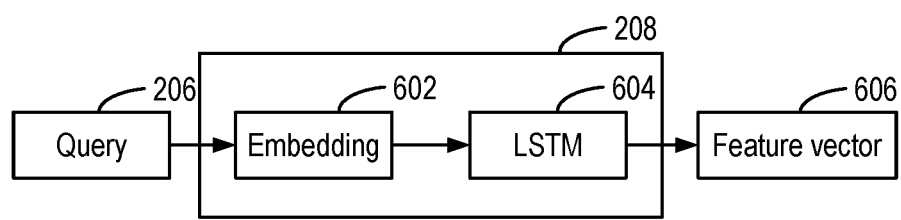
FIG. 6 illustrates a schematic diagram of a language encoder in accordance with some implementations of the subject matter.

FIG. 6 illustrates a schematic diagram of the language encoder 208 in accordance with some implementations of the subject matter. As shown, the language encoder 208 includes an embedding layer 602 and a Long Short Term Memory (LSTM) network 604. For example, for each word $s_i$ in the query 206 (e.g., input sentence S), the embedding layer 602 may generate an embedding vector representing the word $w_i \in \mathbb{R}^{d^S}$, where $d^S$ denotes the vector length. The embedding layer 602 may output word embeddings $\{w_i\}_{i=0}^{l^S-1}$ to the LSTM network 604, which may include multi-layer bi-directional LSTM like three-layer Bi-LSTM. The LSTM network 604 may take its last hidden state as the feature representation of the input sentence S, i.e., feature vector 606 denoted as $f^S \in \mathbb{R}^{d^S}$. The feature vector 606 encodes the language structure of the query 206 to embody information of moment-of-interest of the query 206. It should be understood that the encoder 208 shown in FIG. 6 is provided only as an example and any other suitable encoder structure currently known or to be developed may also be used.

Figure 7:
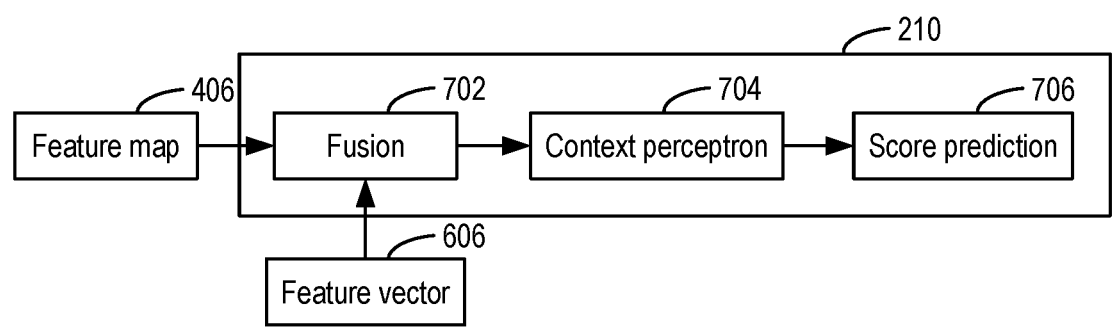
FIG. 7 illustrates a schematic diagram of a temporal adjacent network in accordance with some implementations of the subject matter.

FIG. 7 illustrates a schematic diagram of the temporal adjacent network 210 in accordance with some implementations of the subject matter. As shown, a fuser 702 may fuse the 2D temporal feature map 406 or $F^M$ with the feature vector 606 or $f^S$. In one implementation, the fuser 702 may include a fully-connected layer which projects the two features into a unified sub-space. The fuser 702 may also include a Hadamard product and $l_2$ normalization for fusing the projected features. The fused feature map may also have a dimension of $N \times N \times d^V$. The fuser 702 may be represented in the mathematical form as:

$$F = \|(w^S \cdot f^S \cdot \mathbb{1}^T) \odot (W^M \cdot F^M)\|_2 \quad (3)$$

where $w^S$ and $w^M$ denote learning parameters of the fully-connected layer, $\mathbb{1}^T$ denotes transposition of an all-ones vector, $\odot$ denotes Hadamard product and $\|\cdot\|_2$ denotes $l_2$ normalization.

It should be appreciated that the fuser 702 may be implemented using other neural network architecture, for example, by an attention mechanism.

A context perceptron 704 may construct the temporal adjacent network on the fused 2D temporal feature map F. For example, the context perceptron 704 may include a convolutional neural network with L convolutional layers and a kernel size of k. The output of the context perceptron 704 may keep the same shape as the input fusion feature map, i.e., N×N. The context perceptron 704 enables a model to gradually perceive more context of the adjacent candidate moments while learning differences between the candidate moments. In addition, receptive field of the network is huge, so it can observe the contents of the entire video and sentence, resulting in learning the temporal dependency.

In some implementations, the convolutional neural network may include a dilated convolution. The sparse sampling as described above may be implemented by adaptively modifying or adapting the stride parameter of the dilated convolution. For example, a 3×3 convolution kernel, if the stride is set to 1, is equivalent to a convolution kernel of 5×5 with 16 dilations or holes where only 9 points are sampled.

A large stride is used at a low sampling rate and a small stride is used at a high sampling rate. As described above, the sampling rate is related to the moment length; a low sampling rate may be adopted for a long moment, while a high sampling rate may be adopted for a short moment. Therefore, a large stride may be adapted for a long moment and a small stride may be adopted for a short moment.

Zero-padded areas are present in the 2D fusion feature map. In some implementations, when convolution is performed on these areas, only the values in the valid area are calculated. In other words, the zero-padded features are not considered in the calculation to lower the computation overheads.

A score predictor 706 may predict, based on the feature map output by the context perceptron, matching scores between the candidate moments and the natural language query. For example, the score predictor 706 may include a fully-connected layer and an activation function layer. For example, sigmoid function may be used as the activation function.

Figure 8:
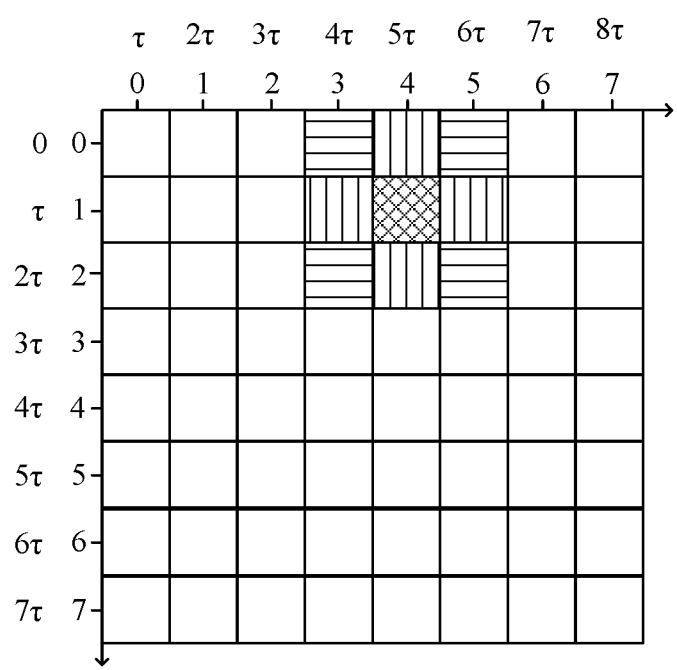
FIG. 8 illustrates a schematic diagram of scores in accordance with some implementations of the subject matter.

FIG. 8 illustrates a schematic diagram of the 2D temporal map in accordance with some implementations of the subject matter. The 2D temporal map corresponds to the 2D temporal feature map in FIGS. 3A and 3B. The 2D temporal map is also referred to as 2D score plot, where each square represents the score of the corresponding candidate moment. For example, coordinates (1, 4) shows the highest score, which indicates that the moment starting from time □ to time 5□ is the best match for the query.

For example, according to the candidate indicator G(a, b) in Equation (1), all valid scores on the 2D temporal map may be collected, denoted as $P=\{p_i\}_{i=0}^C$, where C is the total number of candidate moments. Each value $p_i$ on the 2D temporal map represents the matching score between a candidate moment and the queried sentence. The maximum value indicates the best matching moment.

During training, the computation cost or overhead may be reduced by using scaled Intersection Over Union (IoU) values as the supervision signal. Specifically, for each candidate moment, its IoU score $o_i$ with the ground truth moment may be calculated. The IoU score $o_i$ is then scaled by two thresholds $t_{min}$ and $t_{max}$ as $$y_i = \begin{cases} 0 & o_i \le t_{min}, \\ \frac{o_i - t_{min}}{t_{max} - t_{min}} & t_{min} < o_i < t_{max}, \\ 1 & o_i \le t_{max} \end{cases} \quad (4)$$

and $y_i$ servers as the supervision label. In some implementations, the training may be performed using a binary cross entropy loss function shown in Equation (5).

$$\text{Loss} = \frac{1}{C}\sum_{i=1}^{C} y_i \log p_i + (1-y_i)\log(1-p_i) \quad (5)$$

where $p_i$ denotes the output score of a moment.

Figure 9:
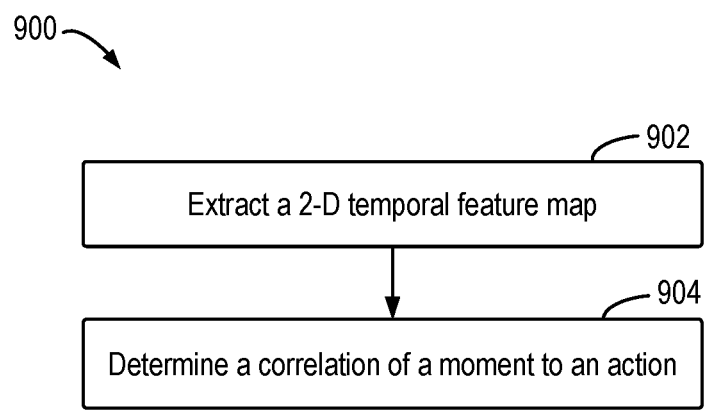
FIG. 9 illustrates a flowchart of a method in accordance with some implementations of the subject matter.

FIG. 9 illustrates a flowchart of a method 900 in accordance with some implementations of the subject matter. The method 900 may be combined with the embodiments as shown in FIGS. 1-8. For example, the method 900 may be implemented in the NN module 122 as shown in FIG. 1 and may also be implemented by the neural network 200 of FIG. 2.

At block 902, a two-dimensional temporal feature map representing a plurality of moments within a media stream is extracted from the media stream, wherein the two-dimensional temporal feature map comprises a first dimension representing a start of a respective one of the plurality of moments and a second dimension representing an end of a respective one of the plurality of moments. For example, the two-dimensional temporal feature map may be the ones as shown in FIGS. 3A, 3B, and 5. For example, the first dimension may be the start of a candidate moment and the second dimension may be the end of a candidate moment. For example, the media stream may include untrimmed media stream, such as video and/or audio.

In some implementations, extracting the two-dimensional temporal feature map includes: segmenting the media stream into a plurality of clips; extracting features of respective ones of the plurality of clips to obtain a feature map of the media stream; and extracting, from features of one or more clips corresponding to a moment of the plurality of moments in the feature map of the media stream, features of this moment as a part of the two-dimensional temporal feature map.

In some implementations, extracting features of a particular candidate moment includes: extracting by pooling, from features of one or more clips corresponding to the particular candidate moment, features of the particular candidate moment. For example, the pooling may be max pooling.

At block 904, a correlation between the plurality of moments and an action in the media stream is determined based on the two-dimensional temporal feature map. The correlation may be embodied in the form of score, probability or the like. In moment localization with natural language, action may be specified by the query. For temporal action proposal and temporal action detection, the action may be any possible action(s) in the media stream.

In some implementations, determining the correlation comprises: sampling the plurality of moments at respective sample rates to determine a plurality of candidate moments, wherein the sample rates are adaptively adjusted based on lengths of respective ones of the plurality of moments; and determining a correlation between the plurality of candidate moments and the action in the media stream.

In some implementations, the sample rates are configured to decrease as the lengths of the respective moments increase.

In some implementations, determining the correlation comprises: applying a convolutional layer to the two-dimensional temporal feature map to obtain a further feature map having a same dimension as the two-dimensional temporal feature map; and determining, based on the further feature map, scores of correlation between the plurality of moments and the action in the media stream.

In some implementations, the convolutional layer comprises a dilated convolution and strides of the dilated convolution are configured to increase as lengths of the respective moments increase.

In some implementations, determining the correlation comprises: in response to receiving a query for a particular action in the media stream, extracting a feature vector of the query; and determining the correlation based on the feature vector of the query and the two-dimensional temporal feature map.

In some implementations, determining the correlation comprises: fusing the feature vector of the query and the two-dimensional temporal feature map to generate a further two-dimensional temporal feature map having a same dimension as the two-dimensional temporal feature map; and determining, based on the further two-dimensional temporal feature map, the correlation between the plurality of moments and the particular action.

In some implementations, fusing the feature vector of the query and the two-dimensional temporal feature map comprises: generating the further two-dimensional temporal feature map by applying a Hadamard product to the feature vector of the query and the two-dimensional temporal feature map.

Some example implementations of the present disclosure are listed below.

In a first aspect, there is provided a computer-implemented method. The method comprises: extracting, from a media stream, a two-dimensional temporal feature map representing a plurality of moments within the media stream, wherein the two-dimensional temporal feature map comprises a first dimension representing a start of a respective one of the plurality of moments and a second dimension representing an end of a respective one of the plurality of moments; and determining, based on the two-dimensional temporal feature map, a correlation between the plurality of moments and an action in the media stream.

In some implementations, extracting the two-dimensional temporal feature map comprises: segmenting the media stream into a plurality of clips; extracting features of respective ones of the plurality of clips to obtain a feature map of the media stream; and extracting, from features of one or more clips corresponding to a moment of the plurality of moments in the feature map of the media stream, features of this moment as a part of the two-dimensional temporal feature map.

In some implementations, determining the correlation comprises: sampling the plurality of moments at respective sample rates to determine a plurality of candidate moments, wherein the sample rates are adaptively adjusted based on lengths of respective ones of the plurality of moments; and determining a correlation between the plurality of candidate moments and the action in the media stream.

In some implementations, the sample rates are configured to decrease as the lengths of the respective moments increase.

In some implementations, determining the correlation comprises: applying a convolutional layer to the two-dimensional temporal feature map to obtain a further feature map having a same dimension as the two-dimensional temporal feature map; and determining, based on the further feature map, scores of correlation between the plurality of moments and the action in the media stream.

In some implementations, the convolutional layer comprises a dilated convolution and strides of the dilated convolution are configured to increase as lengths of the respective moments increase.

In some implementations, determining the correlation comprises: in response to receiving a query for a particular action in the media stream, extracting a feature vector of the query; and determining the correlation based on the feature vector of the query and the two-dimensional temporal feature map.

In some implementations, determining the correlation comprises: fusing the feature vector of the query and the two-dimensional temporal feature map to generate a further two-dimensional temporal feature map having a same dimension as the two-dimensional temporal feature map; and determining, based on the further two-dimensional temporal feature map, the correlation between the plurality of moments and the particular action.

In some implementations, fusing the feature vector of the query and the two-dimensional temporal feature map comprises: generating the further two-dimensional temporal feature map by applying a Hadamard product to the feature vector of the query and the two-dimensional temporal feature map.

In some implementations, the first dimension is the start of the respective one of the plurality of moments and the second dimension is the end of the respective one of the plurality of moments.

In some implementations, the media stream comprises an untrimmed media stream.

In some implementations, extracting features of a particular candidate moment comprises: extracting by pooling, from features of one or more clips corresponding to the particular candidate moment, features of the particular candidate moment.

In some implementations, the pooling may be max pooling.

In some implementations, the media stream comprises at least one of video stream and audio stream.

In a second aspect, there is provided a device comprising: a processing unit; and a memory coupled to the processing unit and having instructions stored thereon, the instructions, when executed by the processing unit, causing the device to perform acts comprising: extracting, from a media stream, a two-dimensional temporal feature map representing a plurality of moments within the media stream, wherein the two-dimensional temporal feature map comprises a first dimension representing a start of a respective one of the plurality of moments and a second dimension representing an end of a respective one of the plurality of moments; and determining, based on the two-dimensional temporal feature map, a correlation between the plurality of moments and an action in the media stream.

In some implementations, extracting the two-dimensional temporal feature map comprises: segmenting the media stream into a plurality of clips; extracting features of respective ones of the plurality of clips to obtain a feature map of the media stream; and extracting, from features of one or more clips corresponding to a moment of the plurality of moments in the feature map of the media stream, features of this moment as a part of the two-dimensional temporal feature map.

In some implementations, determining the correlation comprises: sampling the plurality of moments at respective sample rates to determine a plurality of candidate moments, wherein the sample rates are adaptively adjusted based on lengths of respective ones of the plurality of moments; and determining a correlation between the plurality of candidate moments and the action in the media stream.

In some implementations, the sample rates are configured to decrease as the lengths of the respective moments increase.

In some implementations, determining the correlation comprises: applying a convolutional layer to the two-dimensional temporal feature map to obtain a further feature map having a same dimension as the two-dimensional temporal feature map; and determining, based on the further feature map, scores of correlation between the plurality of moments and the action in the media stream.

In some implementations, the convolutional layer comprises a dilated convolution and strides of the dilated convolution are configured to increase as lengths of the respective moments increase.

In some implementations, determining the correlation comprises: in response to receiving a query for a particular action in the media stream, extracting a feature vector of the query; and determining the correlation based on the feature vector of the query and the two-dimensional temporal feature map.

In some implementations, determining the correlation comprises: fusing the feature vector of the query and the two-dimensional temporal feature map to generate a further two-dimensional temporal feature map having a same dimension as the two-dimensional temporal feature map; and determining, based on the further two-dimensional temporal feature map, the correlation between the plurality of moments and the particular action.

In some implementations, fusing the feature vector of the query and the two-dimensional temporal feature map comprises: generating the further two-dimensional temporal feature map by applying a Hadamard product to the feature vector of the query and the two-dimensional temporal feature map.

In some implementations, the first dimension is the start of the respective one of the plurality of moments and the second dimension is the end of the respective one of the plurality of moments.

In some implementations, the media stream comprises an untrimmed media stream.

In some implementations, extracting features of a particular candidate moment comprises: extracting by pooling, from features of one or more clips corresponding to the particular candidate moment, features of the particular candidate moment.

In some implementations, the pooling may be max pooling.

In some implementations, the media stream comprises at least one of video stream and audio stream.

In a third aspect, there is provided a computer program product being tangibly stored in a non-transitory computer storage medium and including computer-executable instructions which, when executed by a device, cause the device to perform the method of the first aspect.

In a fourth aspect, there is provided a computer-readable storage medium having computer-executable instructions stored thereon, the computer-executable instructions, when executed by a device, cause the device to perform the method of the first aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   extracting, from a media stream, a two-dimensional temporal feature map representing a plurality of moments within the media stream, wherein the two-dimensional temporal feature map comprises a first dimension representing a start of a respective one of the plurality of moments and a second dimension representing an end of a respective one of the plurality of moments;
   encoding a sentence feature extracted from an input;
   fusing the encoded sentence feature with the two-dimensional temporal feature map into a unified subspace as a fused two-dimensional temporal map;
   applying a convolutional layer to the two-dimensional temporal feature map to obtain a further feature map having a same dimension as the two-dimensional temporal feature map, the convolutional layer comprises a dilated convolution and strides of the dilated convolution are configured to increase as lengths of the respective moments increase;
   generating a temporal adjacent network using the fused two-dimensional temporal map and the further feature map;
   determining, using the temporal adjacent network, a correlation between the plurality of moments and an action in the media stream; and
   identifying a matching a set of candidate moments for the input using the temporal adjacent network.

2. The method of claim 1, wherein extracting the two-dimensional temporal feature map comprises:
   segmenting the media stream into a plurality of clips;
   extracting features of respective ones of the plurality of clips to obtain a feature map of the media stream; and
   extracting, from features of one or more clips corresponding to a moment of the plurality of moments in the feature map of the media stream, features of this moment as a part of the two-dimensional temporal feature map.

3. The method of claim 1, wherein determining the correlation comprises:
   sampling the plurality of moments at respective sample rates to determine a plurality of candidate moments, wherein the sample rates are adaptively adjusted based on lengths of respective ones of the plurality of moments; and determining a correlation between the plurality of candidate moments and the action in the media stream.

4. The method of claim 3, wherein the sample rates are configured to decrease as the lengths of the respective moments increase.

5. The method of claim 1, wherein determining the correlation comprises:

applying a convolutional layer to the two-dimensional temporal feature map to obtain a further feature map having a same dimension as the two-dimensional temporal feature map; and determining, based on the further feature map, scores of correlation between the plurality of moments and the action in the media stream.

6. The method of claim 1, wherein determining the correlation comprises:

in response to receiving a query for a particular action in the media stream, extracting a feature vector of the query; and determining the correlation based on the feature vector of the query and the two-dimensional temporal feature map.

7. The method of claim 6, wherein determining the correlation comprises:

fusing the feature vector of the query and the two-dimensional temporal feature map to generate a further two-dimensional temporal feature map having a same dimension as the two-dimensional temporal feature map; and determining, based on the further two-dimensional temporal feature map, the correlation between the plurality of moments and the particular action.

8. The method of claim 7, wherein fusing the feature vector of the query and the two-dimensional temporal feature map comprises:

generating the further two-dimensional temporal feature map by applying a Hadamard product to the feature vector of the query and the two-dimensional temporal feature map.

9. The method of claim 6, wherein the query comprises a natural language query.

10. The method of claim 1, wherein the media stream comprises an untrimmed media stream.

11. A device comprising:

a processing unit; and a memory coupled to the processing unit and having instructions stored thereon, the instructions, when executed by the processing unit, causing the device to perform acts comprising:

extracting, from a media stream, a two-dimensional temporal feature map representing a plurality of moments within the media stream, wherein the two-dimensional temporal feature map comprises a first dimension representing a start of a respective one of the plurality of moments and a second dimension representing an end of a respective one of the plurality of moments;

encoding a sentence feature extracted from an input;

fusing the encoded sentence feature with the two-dimensional temporal feature map into a unified subspace as a fused two-dimensional temporal map;

applying a convolutional layer to the two-dimensional temporal feature map to obtain a further feature map having a same dimension as the two-dimensional temporal feature map, the convolutional layer comprises a dilated convolution and strides of the dilated convolution are configured to increase as lengths of the respective moments increase;

generating a temporal adjacent network using the fused two-dimensional temporal map and the further feature map;

determining, using the temporal adjacent network, a correlation between the plurality of moments and an action in the media stream; and identifying a matching a set of candidate moments for the input using the temporal adjacent network.

12. The device of claim 11, wherein extracting the two-dimensional temporal feature map comprises:

segmenting the media stream into a plurality of clips;

extracting features of respective ones of the plurality of clips to obtain a feature map of the media stream; and extracting, from features of one or more clips corresponding to a moment of the plurality of moments in the feature map of the media stream, features of this moment as a part of the two-dimensional temporal feature map.

13. The device of claim 11, wherein determining the correlation comprises:

sampling the plurality of moments at respective sample rates to determine a plurality of candidate moments, wherein the sample rates are adaptively adjusted based on lengths of respective ones of the plurality of moments; and determining a correlation between the plurality of candidate moments and the action in the media stream.

14. At least one non-transitory machine-readable medium comprising computer-executable instructions which, when executed by a device, cause the device to perform operations to:

extract, from a media stream, a two-dimensional temporal feature map representing a plurality of moments within the media stream, wherein the two-dimensional temporal feature map comprises a first dimension representing a start of a respective one of the plurality of moments and a second dimension representing an end of a respective one of the plurality of moments;

encode a sentence feature extracted from an input;

fuse the encoded sentence feature with the two-dimensional temporal feature map into a unified subspace as a fused two-dimensional temporal map;

apply a convolutional layer to the two-dimensional temporal feature map to obtain a further feature map having a same dimension as the two-dimensional temporal feature map, the convolutional layer comprises a dilated convolution and strides of the dilated convolution are configured to increase as lengths of the respective moments increase;

generate a temporal adjacent network using the fused two-dimensional temporal map and the further feature map;

determine, using the temporal adjacent network, a correlation between the plurality of moments and an action in the media stream; and identify a matching a set of candidate moments for the input using the temporal adjacent network.

15. The at least one non-transitory machine-readable medium of claim 14, the instructions to extract the two-dimensional temporal feature map comprising instructions to:

segment the media stream into a plurality of clips;

extract features of respective ones of the plurality of clips to obtain a feature map of the media stream; and extract, from features of one or more clips corresponding to a moment of the plurality of moments in the feature map of the media stream, features of this moment as a part of the two-dimensional temporal feature map.

16. The at least one non-transitory machine-readable medium of claim 14, the instructions to determine the correlation comprising instructions to:

sample the plurality of moments at respective sample rates to determine a plurality of candidate moments, wherein the sample rates are adaptively adjusted based on lengths of respective ones of the plurality of moments; and determine a correlation between the plurality of candidate moments and the action in the media stream.

17. The at least one non-transitory machine-readable medium of claim 16, wherein the sample rates are configured to decrease as the lengths of the respective moments increase.

18. The at least one non-transitory machine-readable medium of claim 14, the instructions to determine the correlation comprising instructions to:

applying a convolutional layer to the two-dimensional temporal feature map to obtain a further feature map having a same dimension as the two-dimensional temporal feature map; and determining, based on the further feature map, scores of correlation between the plurality of moments and the action in the media stream.

19. The device of claim 11, wherein determining the correlation comprises:

in response to receiving a query for a particular action in the media stream, extracting a feature vector of the query; and determining the correlation based on the feature vector of the query and the two-dimensional temporal feature map.

20. The at least one non-transitory machine-readable medium of claim 14, the instructions to determine the correlation further comprising instructions to:

in response to receipt of a query for a particular action in the media stream, extract a feature vector of the query; and determine the correlation based on the feature vector of the query and the two-dimensional temporal feature map.

\* \* \* \* \*